United States Patent
Jain et al.

(10) Patent No.: US 12,307,785 B2
(45) Date of Patent: *May 20, 2025

(54) ADAPTIVE OBJECT TRACKING ALGORITHM FOR AUTONOMOUS MACHINE APPLICATIONS

(71) Applicant: NVIDIA Corporation, Santa Clara, CA (US)

(72) Inventors: Vikas Ashok Jain, Maharashtra (IN); Samir Sukhdeo Shelke, Dhanori (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,729

(22) Filed: Feb. 17, 2023

(65) Prior Publication Data

US 2023/0206651 A1 Jun. 29, 2023

Related U.S. Application Data

(63) Continuation of application No. 17/014,075, filed on Sep. 8, 2020, now Pat. No. 11,636,689.

(51) Int. Cl.
*G06V 10/94* (2022.01)
*G06T 7/20* (2017.01)
(Continued)

(52) U.S. Cl.
CPC ............... *G06V 20/58* (2022.01); *G06T 7/20* (2013.01); *G06V 10/955* (2022.01);
(Continued)

(58) Field of Classification Search
CPC .... G06V 10/955; G06V 20/58; G06V 20/588; G06T 2207/20084; G06T 2207/30261;
(Continued)

(56) References Cited

U.S. PATENT DOCUMENTS 9,517,767 B1 12/2016 Kentley et al.
10,121,082 B2 * 11/2018 Heisele .................... B60R 1/00
(Continued)

FOREIGN PATENT DOCUMENTS

CN 109191492 A 1/2019
CN 110198875 A 9/2019
(Continued)

OTHER PUBLICATIONS

CN110927742 translation (Year: 2020).*
(Continued)

*Primary Examiner* — Carol W Chan
(74) *Attorney, Agent, or Firm* — Taylor English Duma L.L.P.

(57) ABSTRACT

In various examples, lane location criteria and object class criteria may be used to determine a set of objects in an environment to track. For example, lane information, freespace information, and/or object detection information may be used to filter out or discard non-essential objects (e.g., objects that are not in an ego-lane or adjacent lanes) from objects detected using an object detection algorithm. Further, objects corresponding to non-essential object classes may be filtered out to generate a final filtered set of objects to be tracked that may be of a lower quantity than the actual number of detected objects. As a result, object tracking may only be executed on the final filtered set of objects, thereby decreasing compute requirements and runtime of the system without sacrificing object tracking accuracy and reliability with respect to more pertinent objects.

20 Claims, 14 Drawing Sheets

(51) Int. Cl.
  *G06V 20/56* (2022.01)
  *G06V 20/58* (2022.01)
(52) U.S. Cl.
  CPC .. *G06V 20/588* (2022.01); *G06T 2207/20084* (2013.01); *G06T 2207/30261* (2013.01)
(58) Field of Classification Search
  CPC . G06T 2207/20081; G06T 2207/30256; G06T 7/70; G06T 7/20; G06T 7/246; G06N 3/045; G06N 3/08
  See application file for complete search history.

(56) References Cited

U.S. PATENT DOCUMENTS

| | | | |
|---|---|---|---|
| 10,427,631 | B1 | 10/2019 | Jimenez et al. |
| 10,885,698 | B2 | 1/2021 | Muthler et al. |
| 11,636,689 | B2 | 4/2023 | Jain et al. |
| 2005/0251323 | A1* | 11/2005 | Heinrichs-Bartscher ............ G01S 13/66 701/117 |
| 2006/0100775 | A1* | 5/2006 | Michi ............ B60K 31/0008 701/400 |
| 2008/0107304 | A1 | 5/2008 | Coulter et al. |
| 2010/0165102 | A1 | 7/2010 | Klebanov et al. |
| 2012/0229643 | A1 | 9/2012 | Chidanand et al. |
| 2017/0120803 | A1 | 5/2017 | Kentley et al. |
| 2017/0220876 | A1* | 8/2017 | Gao ............ G06V 10/82 |
| 2018/0053060 | A1 | 2/2018 | Huang et al. |
| 2018/0341821 | A1 | 11/2018 | Hovis et al. |
| 2019/0250622 | A1* | 8/2019 | Nister ............ G06V 20/584 |
| 2019/0266418 | A1 | 8/2019 | Ku et al. |
| 2019/0311546 | A1 | 10/2019 | Tay et al. |
| 2019/0333232 | A1* | 10/2019 | Vallespi-Gonzalez ............ G06V 20/30 |
| 2019/0347805 | A1* | 11/2019 | Potthast ............ G06T 7/246 |
| 2021/0042592 | A1* | 2/2021 | Hashimoto ............ G06V 10/764 |
| 2021/0253131 | A1 | 8/2021 | Sen et al. |
| 2021/0403001 | A1 | 12/2021 | Del Pero et al. |

FOREIGN PATENT DOCUMENTS

| | | | | |
|---|---|---|---|---|
| CN | 110927742 | A | * 3/2020 | |
| EP | 2169427 | A1 | * 3/2010 | ........... G01S 13/867 |
| EP | 3360747 | | 8/2018 | |
| JP | 2000067368 | A | 3/2000 | |
| JP | 2011118889 | A | 6/2011 | |
| JP | 2019207655 | A | 12/2019 | |

OTHER PUBLICATIONS

Kemsaram, Narsimlu, Anweshan Das, and Gijs Dubbelman. "An integrated framework for autonomous driving: object detection, lane detection, and free space detection." In 2019 Third World Conference on Smart Trends in Systems Security and Sustainability (WorldS4), pp. 260-265. IEEE, 2019. (Year: 2019).

Jain, Vikas Ashok; Non-Final Office Action for U.S. Appl. No. 17/014,075, filed Sep. 8, 2020, mailed Aug. 26, 2022, 25 pgs.

Jain, Vikas Ashok; Notice of Allowance for U.S. Appl. No. 17/014,075, filed Sep. 8, 2020, mailed Dec. 29, 2022, 23 pgs.

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Jain, Vikas Ashok; First Office Action for Chinese Patent Application No. 202111030925.7, filed Sep. 3, 2021, mailed Jan. 13, 2025, 12 pgs.  English Abstract Included .

* cited by examiner

500

COMPUTE, USING SENSOR DATA GENERATED BY THE ONE OR MORE SENSORS OF THE EGO-VEHICLE, LANE INFORMATION AND OBJECT DETECTION INFORMATION
B502

BASED AT LEAST IN PART ON THE LANE INFORMATION AND THE OBJECT DETECTION INFORMATION, LOCALIZE OBJECTS TO LANES TO GENERATE A MAPPING
B504

DETERMINE A SUBSET OF THE OBJECTS WITHIN A SUBSET OF THE LANES BASED AT LEAST IN PART ON THE MAPPING AND A LANE LOCATION CRITERIA
B506

TRANSMIT DATA REPRESENTATIVE OF THE SUBSET OF THE OBJECTS TO AN OBJECT TRACKING ALGORITHM FOR TRACKING THE SECOND SUBSET OF THE OBJECTS
B508

FIGURE 5

ADAPTIVE OBJECT TRACKING ALGORITHM FOR AUTONOMOUS MACHINE APPLICATIONS

CROSS-REFERENCE TO RELATED APPLICATIONS

This application is a continuation of U.S. patent application Ser. No. 17/014,075, filed Sep. 8, 2020, which is hereby incorporated by reference in its entirety.

BACKGROUND

Autonomous driving systems and advanced driver assistance systems (ADAS) may leverage sensors, such as cameras, LIDAR sensors, RADAR sensors, etc., to perform various tasks—such as object detection, object tracking, lane keeping, lane changing, lane assignment, camera calibration, turning, path planning, and localization. For example, for autonomous and ADAS systems to operate independently and efficiently, an understanding of the surrounding environment of the vehicle in real-time or near real-time may be generated. Essential to this understanding is object tracking, where a location of objects over time may be used to inform the autonomous system of movement patterns of surrounding objects, locations of surrounding objects, future estimated locations of surrounding objects, and the like.

As an example, the tracked object information may prove useful when making path planning, obstacle avoidance, and/or control decisions. As the environment or scene becomes more congested, and thus more complex to process—such as in urban and/or semi-urban driving environments—an understanding of object locations over time may become more essential to the safe operation of the vehicle. However, conventional systems that employ object tracking—such as those that implement image-based object tracking methods—detect and track each object in the environment of the vehicle. This is true regardless of the location of the object, a direction of travel of the object, and/or an importance of the object for decisions regarding safe and effective driving by the vehicle. As the number of detected objects increases—such as in more complex driving scenes—the compute resource requirements increase and the processing times increase to a point where real-time or near real-time deployment of the system at an acceptable level of safety becomes unattainable.

SUMMARY

Embodiments of the present disclosure relate to adaptive object tracking algorithms for autonomous machine applications. Systems and methods are disclosed that detect objects, and then filter out detected objects to reduce the compute burden while also decreasing run-time for time-bound operations—such as object tracking—in real-time or near real-time. In contrast to conventional systems, such as those described above, the systems and methods of the present disclosure may use lane location criteria and/or essential object class criteria to filter out a subset of detected objects of less importance to accurate and reliable object tracking. As a result, a more focused subset of the detected objects may be processed for object tracking, which in turn reduces the compute burden and the runtime of the system.

For example, lane information, free-space information, and/or object semantic or location information may be used to assign detected objects to lanes, and to filter out non-essential objects prior to processing by an object tracker. A lane graph may be generated using lane information and/or free space information to represent locations and poses of detected lanes to aid in localizing the ego-vehicle and other detected objects in the environment. Locations of the detected lanes may be mapped to locations of the detected objects within the corresponding lanes, and the non-essential objects may be filtered out from the detected objects based on this mapping and lane location criteria. For example, the lane location criteria may indicate essential lanes (e.g., ego-lane, right adjacent lane to the ego-lane, left adjacent lane to the ego-lane, etc.) where essential objects are to be tracked, and objects in non-essential lanes may be filtered out to generate a filtered set of objects. The filtered set of objects associated with non-essential object classes (e.g., pedestrians, traffic lights, stop signs, animals, certain vehicle classes, etc.) may be also be filtered out. As such, the efficiency of the system may be increased without sacrificing quality or reliability as only objects associated with essential object classes (e.g., cars, trucks, motorcyclists, bicyclists) and those located in essential lanes may be provided to an object tracker for tracking.

As a result of reducing the number of objects that need to be tracked over time, the process of detecting and tracking objects may be comparatively less time consuming, less computationally intense, and more scalable as the amount of data to be processed by an object tracker is reduced. In addition, by reducing the amount of data transmitted per frame, the number of frames processed per second may be increased to generate additional results in the same amount of time—thereby increasing the granularity of the object tracking computations of the system.

BRIEF DESCRIPTION OF THE DRAWINGS

The present systems and methods for adaptive object tracking algorithm for autonomous machine applications are described in detail below with reference to the attached drawing figures, wherein:

FIG. 5 is a flow diagram showing a method 500 for detecting objects, and then filtering out detected objects to reduce the compute burden while also decreasing run-time for time-bound operations, in accordance with some embodiments of the present disclosure;

DETAILED DESCRIPTION

Figure 1A:
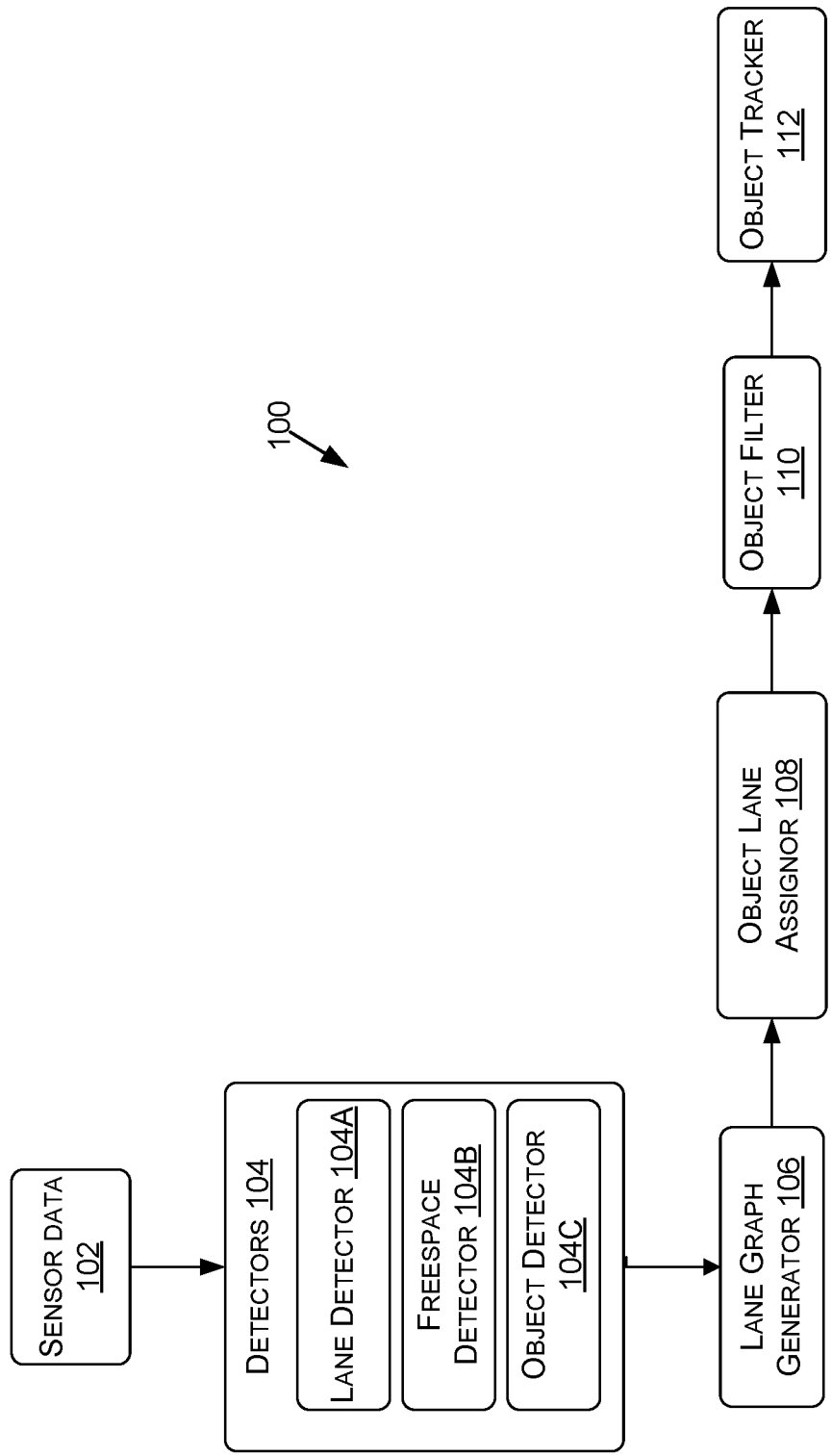
FIG. 1A is an example data flow diagram illustrating an example process for object tracking, in accordance with some embodiments of the present disclosure.

Systems and methods are disclosed related to adaptive object tracking algorithm for autonomous machine applications. Although the present disclosure may be described with respect to an example autonomous vehicle 600 (alternatively referred to herein as "vehicle 600" or "ego-vehicle 600," an example of which is described herein with respect to FIGS. 6A-6D), this is not intended to be limiting. For example, the systems and methods described herein may be used by non-autonomous vehicles, semi-autonomous vehicles (e.g., in one or more advanced driver assistance systems (ADAS)), robots, warehouse or factory vehicles or machines, off-road vehicles, flying vessels, boats, and/or other vehicle types. In addition, although the present disclosure may be described with respect to autonomous driving, this is not intended to be limiting. For example, the systems and methods described herein may be used in robotics (e.g., object detection and tracking for robotics), aerial systems (e.g., object detection and tracking for a drone or other aerial vehicle), boating systems (e.g., object detection and tracking for watercraft), simulation environments (e.g., for simulating object detection and tracking of virtual vehicles within a virtual simulation environment), and/or other technology areas, such as for object detection and object tracking.

In contrast to the conventional techniques, the current systems and methods provide techniques to detect objects, and then filter out detected objects to reduce the compute burden while also decreasing run-time for time-bound operations—such as object tracking. For example, outputs from various sensors (e.g., cameras, RADAR sensors, LIDAR sensors, etc.) of a vehicle may be processed in real-time or near real-time—e.g., using one or more computer vision algorithms, machine learning models, and/or deep neural networks (DNNs)—to discard non-essential objects prior to executing a tracking algorithm for tracking the objects in the surrounding environment. For example, live perception of the vehicle may be used to detect and classify objects only in the vehicle's current lane, a lane to the immediate right of the vehicle's current lane, and/or a lane to the immediate left of the vehicle's current lane. In this way, outputs from one or more algorithms—such as a lane detection algorithm, an object detection and classification algorithm, and/or a free-space detection algorithm—may be used to classify and/or determine objects of importance in a vehicle's path prior to providing the object tracking algorithm with information regarding the to-be-tracked objects. As such, by using lane information, free-space information, object class information, object in path analysis (OIPA), and/or vehicle localization information, the process of detecting and classifying essential objects in a vehicle's environment may be comparatively less time-consuming, less computationally intense, and more scalable as the system may learn to determine, store, and track information regarding only essential objects in a vehicle's environment.

The present systems and methods enable real-time or near real-time tracking of objects in an environment of an ego-vehicle. For example, using various processing steps to filter out certain detected objects prior to tracking, only the most important or highest priority object information is passed to an object tracking algorithm for tracking objects in the environment. In order to filter out the objects, various computer vision algorithms, machine learning models, and/or deep neural networks (DNNs) may be employed to process sensor data generated by sensors of the ego-vehicle to generate an understanding—e.g., via a lane graph, localization thereto, etc.—of the surrounding environment. The sensor data may include sensor data generated by any type of sensor of the ego-vehicle (e.g., cameras, RADAR sensors, LiDAR sensors, ultrasonic sensors, global navigation satellite systems (GNSS) sensors, inertial measurement unit (IMU) sensors, etc.) and may be represented in any acceptable format for processing (e.g., as images, videos, point clouds, depth maps, range images, other sensor data representations, etc.).

The sensor data may be processed for lane detection, free-space detection, object detection and/or classification, and, ultimately, object tracking. For example, locations, directions, orientations, classifications, and/or other information corresponding to lanes in the environment of the vehicle may be computed. In addition, in some embodiments, a location of a boundary that separates drivable free-space from non-drivable space may be computed, and/or the regions of the environment that correspond to drivable free-space may be computed. Objects in the environment may also be detected and/or classified. For example, the objects may be detected and classified by class and/or instance, such that unique object instances can ultimately be tracked by an object tracker. In addition to this information, GNSS sensors, IMUs, high definition (HD) maps, and/or other localization information may be used to localize the ego-vehicle and/or other objects relative to the computed or predicted environment information (e.g., a lane graphs). For example, a lane graph may be generated using the computed lane information, and the localization information of the ego-vehicle. As such, the lane graph may be used to determine the layout of the driving surface, and ultimately, the locations of objects thereon. In some embodiments, information corresponding the drivable free-space may also be included in the lane graph, and/or may be used to map which objects to populate to the lanes (e.g., objects on sidewalks may not be tracked, while objects on the driving surface may).

The mapping between the lanes and the objects may then be used to filter out the non-essential objects such that a set of essential objects may be determined. For example, object-in-path analysis (OIPA) may be executed using the mapping to filter out at least a subset of the detected actors. In a non-limiting example, each of the objects not in the ego-lane, a right adjacent lane of the ego-lane, and a left adjacent lane of the ego-lane—as determined using the OIPA, the lane graph, and the mapping—may be filtered out. The filtered set of objects may then be passed to an object class associator that may use the object detection information (e.g., class and/or instance information) corresponding to the filtered set of objects to further filter out objects corresponding to non-essential classes. As such, in a non-limiting example, each of the remaining objects that is not a car, truck, bicyclist, or motorcyclist may be filtered out. The remaining list of objects may then be passed to an object tracker, and the object tracker may begin or continue (e.g., from any number of prior instances of the tracking algorithm) to track the objects.

In some embodiments, processing may be split between one or more graphics processing units (GPUs) and one or more central processing units (CPUs). For example, the computing or predicting of the lane information, free-space information, object detections and/or classifications, and/or object tracking may be executed using a GPU(s), while the processing of these outputs may be executed using a CPU(s). In addition, in some embodiments, two or more system on chips (SoCs) may be used to perform the operations. As a result, this tracking data may be passed between the various SoCs using transmission control protocol (TCP), and the size of the data passed between SoCs has a direct impact on the latency of the system. As such, by reducing the number of objects that need to be tracked over time, the amount of data transmitted between the SoCs may be reduced, thereby increasing the efficiency of the system. In addition, by reducing the amount of data transmitted per frame, the number of frames processed per second may be increased to generate additional results in the same amount of time—thereby increasing the accuracy and granularity of the object tracking computations of the system.

Now referring to FIG. 1A, FIG. 1A is an example data flow diagram illustrating an example process 100 for detecting objects, and then filtering out detected objects to reduce the compute burden while also decreasing run-time for time-bound operations—such as object tracking, in accordance with some embodiments of the present disclosure. It should be understood that this and other arrangements described herein are set forth only as examples. At a high level, the process 100 may include one or more detectors 104 receiving one or more inputs, such as sensor data 102, and generating one or more outputs, such as one or more lane detections, object detections, and/or free-space detections, which can be used to generate lane graphs, and/or object lane assignments using a lane graph generator 106 and/or object lane assignor 108. Object filter 110 may use the outputs of the lane assignor 108 to filter detected objects. Although the sensor data 102 is primarily discussed with respect to image data representative of images, this is not intended to be limiting, and the sensor data 102 may include other types of sensor data such as, but not limited to, LIDAR data, SONAR data, RADAR data, and/or the like—e.g., as generated by one or more sensors of the vehicle 600 (FIGS. 6A-6D).

The process 100 may include generating and/or receiving sensor data 102 from one or more sensors. The sensor data 102 may be received, as a non-limiting example, from one or more sensors of a vehicle (e.g., vehicle 600 of FIGS. 6A-6C and described herein). The sensor data 102 may be used by the vehicle 600, and within the process 100, to navigate its environment in real-time or near real-time. The sensor data 102 may include, without limitation, sensor data 102 from any of the sensors of the vehicle including, for example and with reference to FIGS. 6A-6C, global navigation satellite systems (GNSS) sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 676, stereo camera(s) 668, wide-view camera(s) 670 (e.g., fisheye cameras), infrared camera(s) 672, surround camera(s) 674 (e.g., 360 degree cameras), long-range and/or mid-range camera(s) 678, speed sensor(s) 644 (e.g., for measuring the speed of the vehicle 600), and/or other sensor types. As another example, the sensor data 102 may include virtual sensor data generated from any number of sensors of a virtual vehicle or other virtual object in a virtual (e.g., testing) environment. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). The sensor data 102 may include original images (e.g., as captured by one or more image sensors), down-sampled images, up-sampled images, cropped or region of interest (ROI) images, otherwise augmented images, and/or a combination thereof. As used herein, the sensor data 102 may reference unprocessed sensor data, pre-processed sensor data, or a combination thereof.

The detectors 104 may include a lane detector 104A, a freespace detector 104B, and/or an object detector 104C. The detectors 104 may include one or more computer vision algorithms, machine learning models, and/or DNNs trained to compute lane information (e.g., location, pose, geometry, etc.), freespace boundary locations, and/or object information (e.g., location, pose, class, etc.) using sensor data 102. For example, and without limitation, the detectors 104 may include machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of machine learning models or algorithms.

As an example, such as where the detectors 104 include a DNN—or more specifically a convolutional neural network (CNN), the detectors 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1× number of classes. In some examples, the CNN may include a fully connected layer(s) such that the output of one or more of the layers of the CNN may be provided as input to a fully connected layer(s) of the CNN. In some examples, one or more convolutional streams may be implemented by the detectors 104, and some or all of the convolutional streams may include a respective fully connected layer(s).

In some non-limiting embodiments, the detectors 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the detectors 104, this is not intended to be limiting. For example, additional or alternative layers may be used in the machine learning model(s) 104, such as normalization layers, SoftMax layers, and/or other layer types.

In embodiments where the detectors 104 includes a CNN, different orders and numbers of the layers of the CNN may be used depending on the embodiment. In other words, the order and number of layers of the detectors 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the detectors 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

The detectors 104 may use the sensor data 102 to detect lanes, freespace boundaries, and/or objects, which may ultimately be applied to the lane graph generator 106 to generate a lane graph and/or the object lane assignor 108 to associate objects with lanes in the lane graph. For example, the lane detector 104A may be trained or programmed to detect lanes and/or associate lane classifications in the sensor data 102. For example, the lane detector 104A may compute locations, directions, orientations, classifications, and/or other information corresponding to lanes in the environment of the vehicle as determined using the sensor data 102.

The freespace detector 104B may be trained or programmed to detect drivable free-space and/or non-drivable space—or boundaries corresponding to the division thereof—in the vehicle's environment using the sensor data 102. For example, the freespace detector 104B may compute a location of a boundary that separates drivable free-space from non-drivable space, and/or the regions of the vehicle's environment that correspond to drivable free-space.

The lane graph generator 106 may use—as input—the outputs of the lane detector 104A and/or the freespace detector 104B. For example, the lane graph generator 106 may compute one or more lane graphs based on the lane and freespace detections. The object lane assignor 108 may use localization information from one or more of GNSS sensors, IMUS, high definition (HD) maps, and/or other localization information to localize the vehicle 600 (and/or surrounding objects) relative to the computed or predicted lane graph or environmental information. For example, the lane graph generator 106 may generate a lane graph using the computed lane information from the lane detector 104A and the current location information of the vehicle 600 (e.g., the lane graph may indicate an ego-lane of the vehicle 600 and other lanes relative to the ego-vehicle location using the current location information of the vehicle 600). As such, the lane graph may represent the layout of the driving surface. In some examples, the lane graph may represent the driving surface using an array of points (e.g., pixels) to represent lanes, and include the source of lane information (e.g., lane detector 104A, HD map), classifications of the lanes (e.g., current lane, left lane, right lane, opposing lane), and localization of the vehicle 600. In this way, the lane graph generator 106 may generate a lane graph representing lanes and localization of the vehicle 600 on the driving surface. In some example, the lane graph generator 106 may include representations of drivable free-space in the lane graph.

The object detector 104C may be trained or programmed to detect and/or classify objects in the environment of vehicle 600 based on sensor data 102. For example, the objects may be detected and classified by class and/or instance, such that unique object instances can ultimately be tracked by the object tracker 112. The object detector 104 may compute bounding boxes around detected objects, and each detected object may be associated with a class—for example and without limitation: car, bicycle, stop sign, yield sign, traffic light, pedestrian, truck, motorcycle, and/or other classifications of objects that the object detector 104C may be trained or programmed to detect. In some examples, the object detector 104C may detect locations of the objects using the sensor data. For example, the output of the object detector 104 may correspond to pixels at the location of an object as being associated with the object and/or the objects class, bounding shape information may be output by the object detector 104C, and/or other object detection representations may be output.

The object lane assignor 108 may take as input the outputs of the lane graph generator 106, the object detector 104C, and/or the freespace detector 104B to generate a mapping between the objects and the lanes that assigns or associates detected objects with lanes of the lane graph. For example, a mapping of the objects to the lanes may be generated using the computed lane information, the localization information of the vehicle 600, and/or information about the detected objects (e.g., object class, object pose, object location, etc.). For example, a detected object may be assigned and/or mapped to a detected lane based on pixels belonging to the object also belonging to the lane. A mapping may include locations of lanes and locations of the detected objects within the corresponding lanes. As such, the mapping may represent not only the layout of the driving surface, but also the locations of objects thereon. In some embodiments, information corresponding the drivable free-space may also be included in the mapping, and/or may be used to determine which objects to include in the mapping (e.g., objects on sidewalks may not be mapped, while objects on the driving surface may). In this way, the object lane assignor 108 may map or assign each detected object to a detected lane or a non-drivable surface by localizing the objects to the corresponding lanes.

The object filter 110 may take as input the mapping output from the object lane assignor 108 and/or the object detector 104C to filter out non-essential objects from the mapped objects to determine a set of essential objects based on various criteria—such as lane location criteria, object type criteria, etc. Lane location criteria may include a set of rules for filtering objects. For example, in some examples, the object filter 110 may execute an object-in-path analysis (OIPA) based on the mapping to filter out at least a subset of the detected objects. For example, each of the objects not in the vehicle's current lane, a right adjacent lane of the current lane, and a left adjacent lane of the current lane—as determined using the OIPA and the mapping—may be filtered out. Lane classes in the mapping may be used to determine the objects in the current lane, left adjacent lane of the current lane, and right adjacent lane of the current lane. The filtered set of objects may then be provided to one or more additional filters, or to the object tracker 112 for tracking.

In some examples, the object filter 110 may filter the set of objects by filtering out objects corresponding to non-essential object classes. For example, output of the object detector 104C—such as object locations, object classes, object instance information, etc.—may be used to filter out the objects belonging to non-essential (or undesired) object classes. For example, outputs of the object detector 104C corresponding to the filtered set of objects may be used by the object filter 110 to further filter out objects corresponding to non-essential object classes. In some examples, each of the objects of the filtered set of objects that do not belong to an object class associated with a car, truck, bicyclist, or motorcyclist may be filtered out. As such, non-essential objects (e.g., traffic lights, pedestrians) may be filtered out prior to tracking. The remaining list of objects may then be passed to the object tracker 112, and the object tracker 112 may begin or continue (e.g., from any number of prior instances of the tracking algorithm) to track the remaining list of objects. It should be noted that although the filtering is described as including filtering based on lane information followed by filtering based on object classes, this is not meant to be limiting. In some examples, the detected objects may be filtered based on object classes prior to filtering based on lane information, and/or one or more other filtering types may be executed in any order, depending on the embodiment.

The object tracker 112 may receive object and lane information corresponding to the remaining list of objects. The object tracker 112 may have a prior list of objects currently being tracked, and the object tracker 112 may compare the remaining list of objects with the prior list of objects currently being tracked to continue tracking an object or start tracking a new object. As such, objects may be added and/or removed from the prior list of objects over time. In some examples, the object tracker 112 may receive an object association score for each of the remaining list of objects from the object lane assignor 108. The score may be based on a confidence of the associated object being in the assigned lane. Objects of the remaining list of objects scored below a predetermined score may be removed from the updated list of objects to be tracked. The updated list of objects to be tracked may be sent to control components of the vehicle 600 for further processing to assist in one or more operations of the vehicle 600—such as path planning, control, actuation, obstacle avoidance, etc.

Figure 1B:
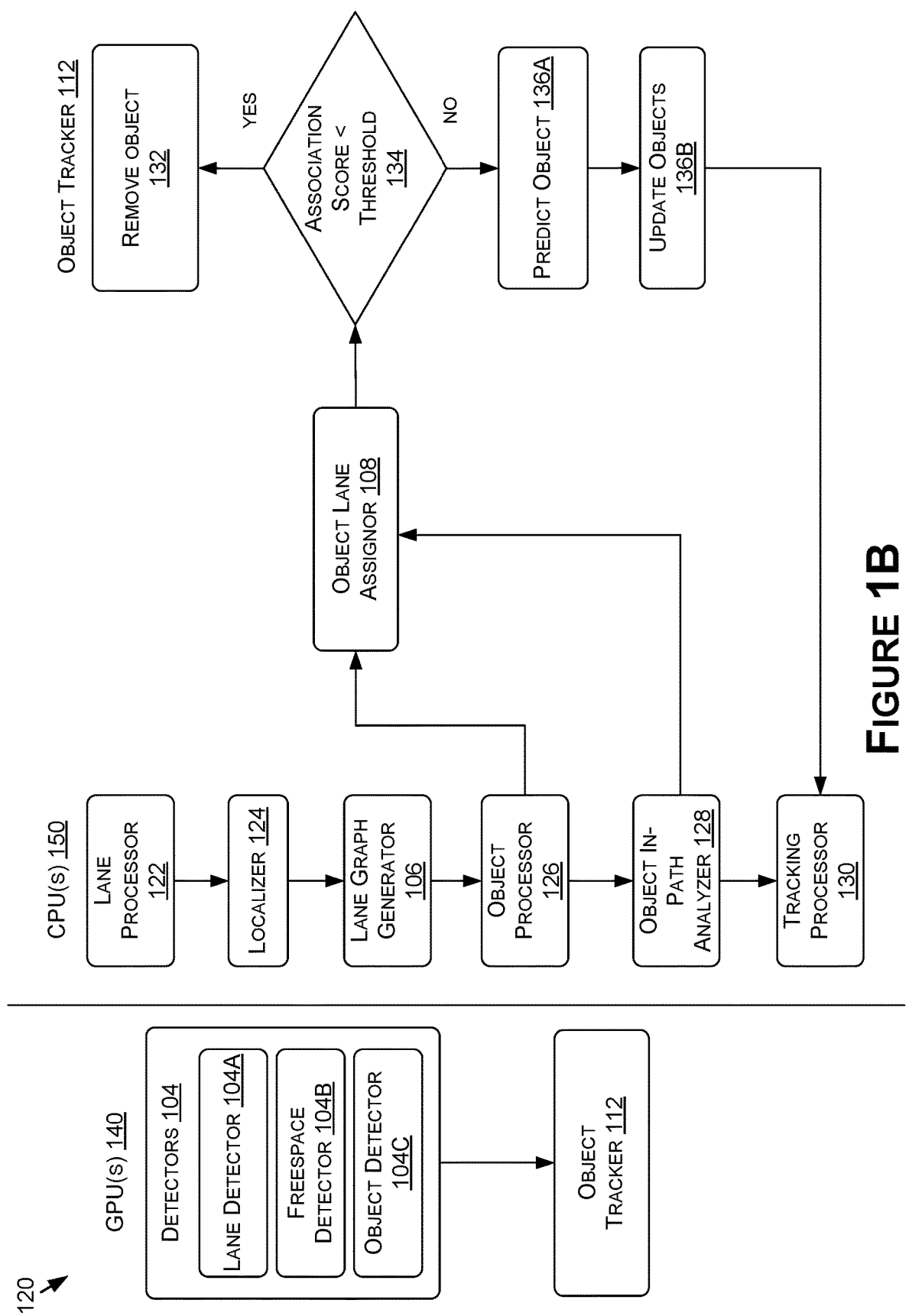
FIG. 1B is an example data flow diagram illustrating an example process for filtering objects to be tracked, in accordance with some embodiments of the present disclosure.

Now referring to FIG. 1B, FIG. 1B is an example data flow diagram illustrating an example process 120 for filtering objects to be tracked, in accordance with some embodiments of the present disclosure. In some examples, processing may be split between one or more graphics processing units (GPUs) 140 and one or more central processing units (CPUs) 150. For example, the computing or predicting of the lane information, free-space information, object detections and/or classifications, and/or object tracking may be executed using a GPU(s), while the processing of these outputs may be executed using a CPU(s). As such, a GPU(s) 140 may execute the detectors 104 and/or the object tracker 112. The lane information, the freespace information, and the object detection information generated by the detectors 104 may ultimately be used by the object tracker 112 to track objects in the environment of the vehicle 600. In this way, lane information may be used to determine essential objects prior to the object tracker 112 tracking the objects. As a result, the GPU(s) 140 may be used to efficiently compute perception information, the CPU(s) 150 may process the perception information, and the GPU(s) 140 may execute the object tracker using feedback from the CPU(s) 150. In some embodiments, one or more of the processing tasks may be executed in parallel using one or more parallel processing units—e.g., parallel processing units of the GPU(s) 140.

The output of each of the detectors 104 (e.g., the lane detector 104B, the freespace detector 104B, and/or the object detector 104C) processed by the GPU(s) 140 may be provided to the CPU(s) 150 for further processing. The CPU 150 may process the outputs of the detectors 104 to determine essential objects to be tracked for safe and efficient navigating of vehicle 600 in real time or near real-time. The CPU 150 may include a lane processor 122, a localizer 124, the lane graph generator 106, an object processor 126, an object in-path analyzer 128, and/or a tracking processor 112. The lane processor 122 may receive as input lane information from the lane detector 104A. The lane processor 122 may process the detected lane location information and/or lane classes.

The localizer 124 may take as input the output of the lane processor 122 to localize the vehicle 600 within the processed lanes. The localizer 124 may also localize the vehicle based on localization information from GNSS sensors, IMUs, high definition (HD) maps, and/or other localization information. The lane graph generator 106 may use the processed lane information and the localization information to generate the lane graph associated with the sensor data 102. For example, the lane graph generator 106 may generate a lane graph using the computed lane information from the lane processor 122 and the localization information from the localizer 124. As such, the lane graph may represent the layout of the driving surface. In some examples, the lane graph may represent the driving surface using an array of points (e.g., pixels) to represent lanes, and include the source of lane information (e.g., lane detector 104A, HD map), classifications of the lanes (e.g., current lane, left lane, right lane, opposing lane, cross lanes), and/or localization of the vehicle 600.

The object processor 126 may use outputs of the object detector 104C to process detected objects. The object processor 126 may process the object detections to determine object locations and/or classifications for each detected object. As a non-limiting example, pixels at object locations may be associated with the corresponding detected objects and/or classifications. The object in-path analyzer 128 may determine lane location and lane class information for the ego-lane (e.g., current lane of the vehicle 600), right adjacent lane to the ego-lane, and the left adjacent lane to the ego-lane. The lane location and lane class information generated by the object in-path analyzer 128 may include an array of points (e.g., pixels) to represent each of the ego-lane, right adjacent lane to the ego-lane, and the left adjacent lane to the ego-lane. The object in-path analyzer 128 may associate detected objects with corresponding lanes based on locations of the detected objects being within locations of the detected lanes in the lane graph. Each object may be associated with a lane or a non-drivable region within the lane graph.

The object lane assignor 108 may take the outputs of the object in-path analyzer 128 as input to perform object filtering operations based on lane location criteria and/or object class criteria. The object lane assignor 108 may generate a mapping associating locations of lanes and locations of objects within the lanes. The object lane assignor 108 may filter the detected objects to determine a set of essential objects based on a lane location criteria. The lane location criteria may include rules regarding filtering out detected objects that are not associated with a subset of lanes (e.g., ego-lane, right adjacent lane to the ego-lane, left adjacent lane to the ego lane). Further, in some examples, the object lane assignor 108 may take in as input the classes associated with each object of the filtered set of objects as processed by the object processor 126. The object lane assignor 108 may further filter out objects from the filtered set of objects based on the object class criteria indicating the object classes as high importance/priority object classes (e.g., cars, trucks, motorcyclists, bicyclists) and/or non-priority object classes (e.g., pedestrians, traffic signals). The objects of the filtered set of objects may then be filtered to remove objects that are associated with non-priority object classes.

The object lane assignor 108 may also generate association scores for each pair of object and lane in the remaining set of essential or prioritized objects. The association score may indicate a probability that the object is located within a particular essential lane (e.g., ego-lane, right adjacent lane to ego-lane, left adjacent lane to ego-lane), and/or a probability that the object belongs an essential or prioritized object class. A predetermined threshold score may be used to determine whether an essential or prioritized object should be predicted and/or updated in the object tracker 112. At option 134, when an association score associated with an essential or prioritized object is below the threshold, the object is removed from consideration at block 132. If the association score is above the threshold, the associated essential or prioritized object may be predicted at block 136A at the corresponding location within the corresponding lane. Further, if the essential or prioritized object is present in the prior tracked objects list, the location of the essential or prioritized object may be updated in the current tracked object lists at block 136B. If an object present in the prior tracked objects list is not detected in the current instance of sensor data 102, the object may be removed from the current tracked objects list.

The remaining list of objects may then by processed by the tracking processor 130 to generate and/or update the tracked objects list with locations and/or classes of the remaining list of objects. The object tracker 112 may then be provided with the current tracked objects lists for tracking.

Figure 2:
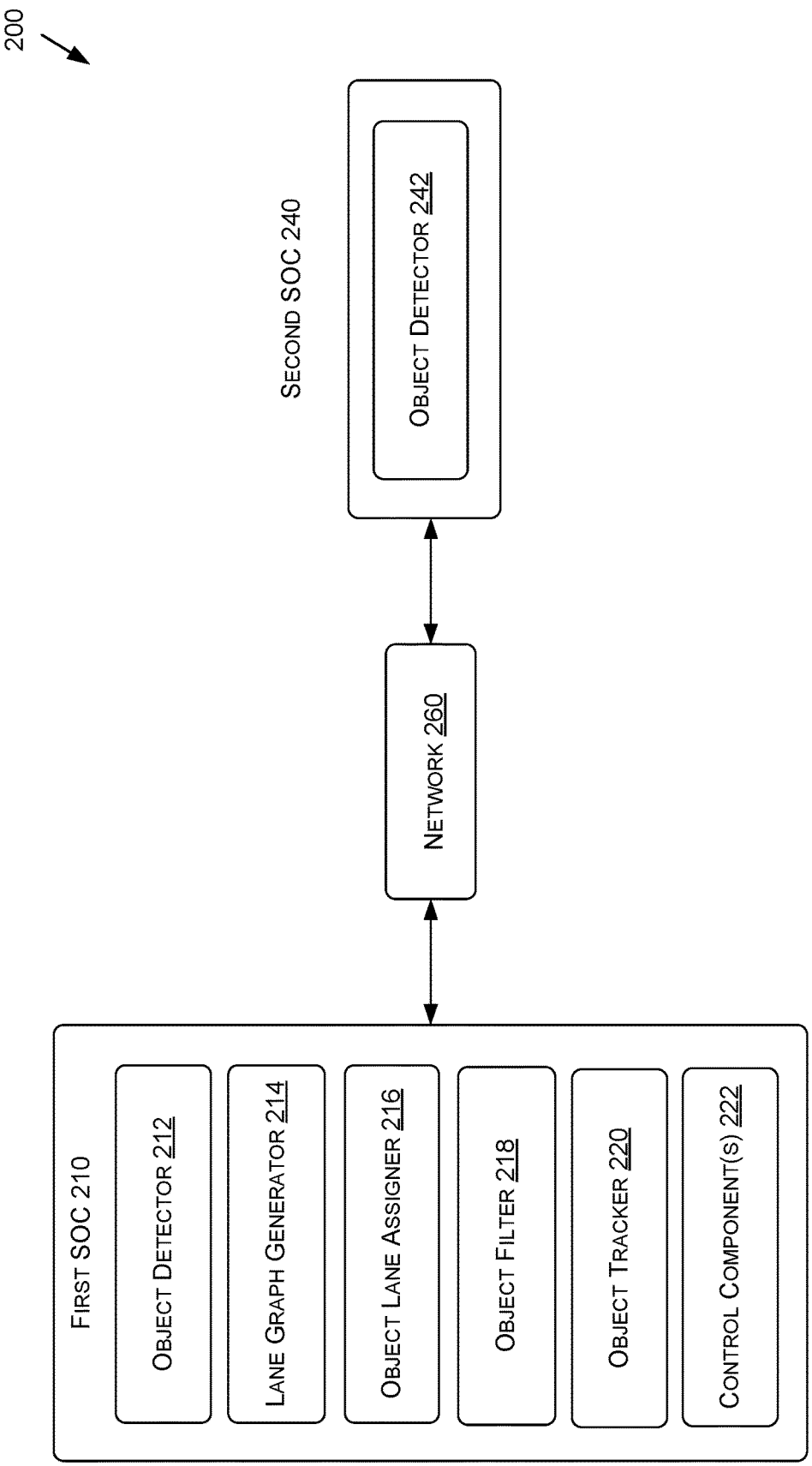
FIG. 2 is a block diagram of an example object tracking system, in accordance with some embodiments of the present disclosure.

Now referring to FIG. 2, FIG. 2 illustrates an example system 200 for possessing the operations, in accordance with some embodiments of the present disclosure. Two SoCs may be used to process the operations described herein—e.g., with respect to FIGS. 1A-1B. The operations may be divided between the first SoC 210 and the second SoC 240. For example, the first SoC 210 may include an object detector 212, a lane graph generator 214, an object lane assignor 216, an object filter 218, an object tracker 220 and/or a control component(s) 222. The second SoC 240 may include an object detector(s) 242—e.g., one or more camera obstacle perception modules. For example, the second SoC 240 may include an N number of camera obstacle perception modules, and the remaining modules or processes may execute on the first SoC 210. In such an example, the network 260 may be used to pass data between the components of the first SoC 210 and the second SoC 240. In some examples, the network 260 may utilize a transmission control protocol (TCP) to transmit data between the two SoCs. For example, the output of the object detector 242 of the second SoC 240 may be transmitted to and/or used by the lane graph generator 214, the object lane assigner 216, the object filter 218, the object tracker 220, and/or other components of the first SoC 210 via the network 260 for processing. The illustrated SoC configurations are provided for example purposes only, and additional and/or alternative SoC configurations may be used without departing from the scope of the present disclosure. For example, where two or more SoCs are used, modules and/or associated tasks may be divided among the SoCs to improve efficiency and/or to provide additional resources to the process. In one or more embodiments, using two or more SoCs may allow for more parallel processing—not only with respect to individual discrete hardware components but also across two or more hardware components.

Figure 3A:
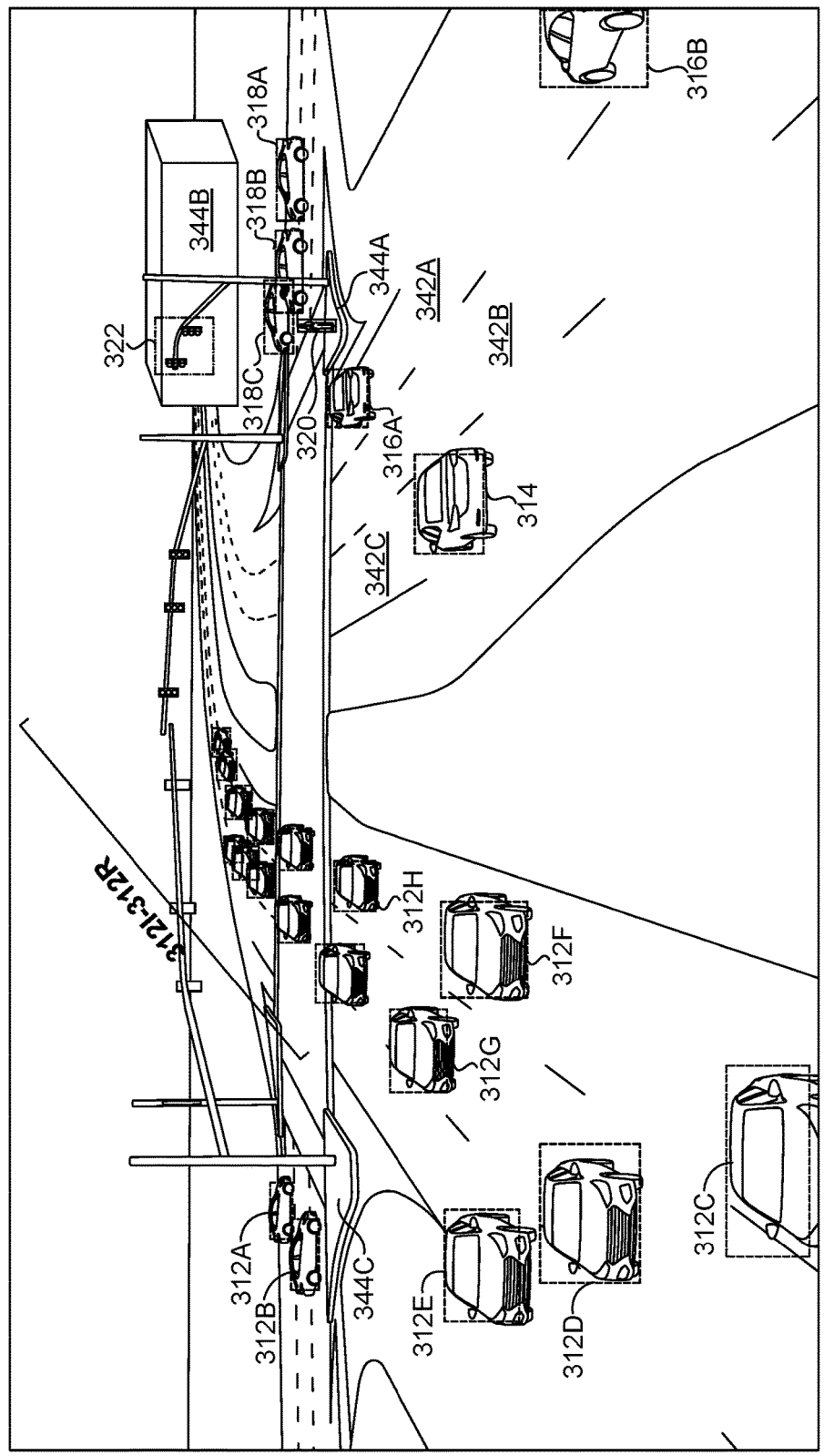
FIG. 3A is an illustration of an example mapping between detected objects and detected lanes, in accordance with some embodiments of the present disclosure.
Figure 3B:
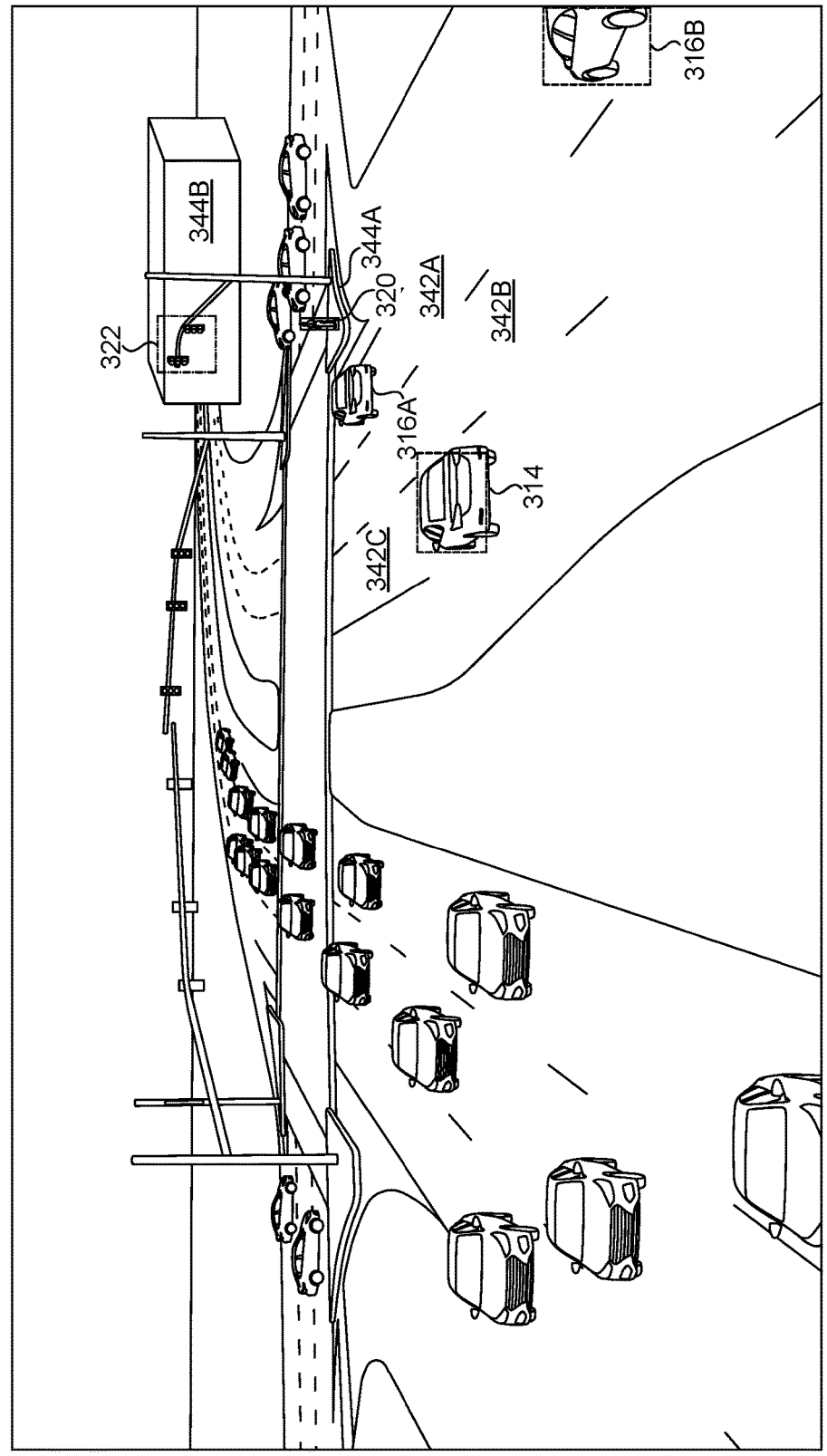
FIG. 3B is an illustration of an example filtered set of objects generated by an object filter based on lane information, in accordance with some embodiments of the present disclosure.
Figure 3C:
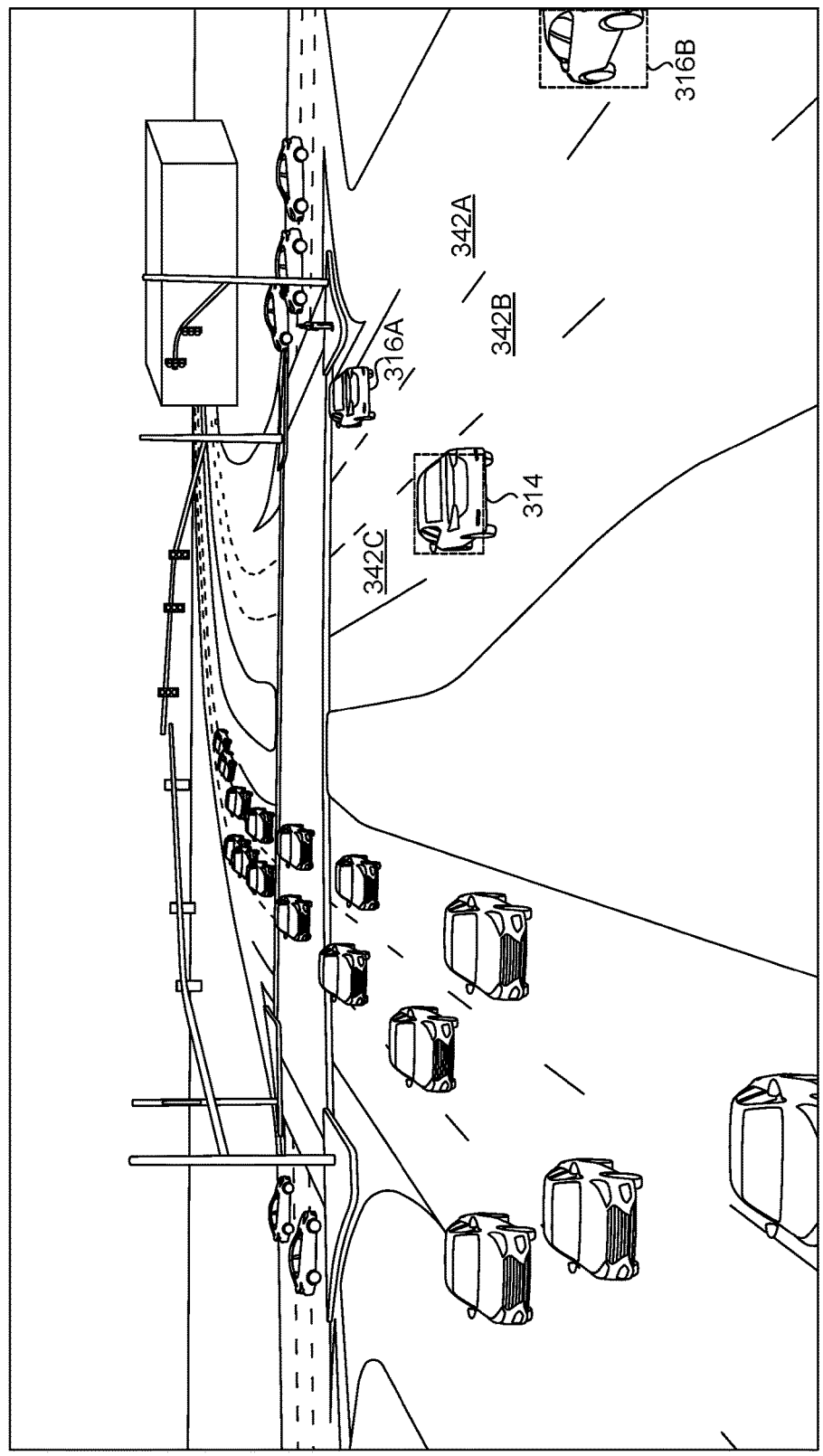
FIG. 3C is an illustration of an example remaining list of objects generated by the object filer based on object class, in accordance with embodiments of the present disclosure.

Referring now to FIGS. 3A-3C, FIGS. 3A-3C illustrate example object filtering applied to a mapping between detected objects and detected lanes, in accordance with some embodiments of the present disclosure. For example, FIG. 3A illustrates an example mapping between detected objects and detected lanes output from an object lane assignor (e.g., the object lane assignor 108) for an image 300. Objects in an image may be detected using bounding boxes (e.g., cars 312A-312R, 314, 316A-316B, 318A-318C; pedestrian 320;

traffic light 322). Each object may be mapped and/or assigned to a lane (e.g., lanes 342A-342C) and/or non-drivable region (e.g., non-drivable regions 344A-344C). For example, car 314 may be mapped to lane 342C, cars 316A and 316B may be mapped to lane 342A, pedestrian 320 may be mapped to the non-drivable region 344A, and the traffic light 322 may be mapped to the non-drivable region 344B.

Now referring to FIG. 3B, FIG. 3B illustrates an example filtered set of objects generated by an object filter (e.g., the object filter 110) based on lane information, in accordance with some embodiments of the present disclosure. Objects mapped to lanes other than the vehicle's current lane (e.g., 342B), right adjacent lane to the current lane (e.g., lane 342A), left adjacent lane to the current lane (e.g., lane 342C) may be filtered out of the detected objects to generate the filtered set of objects. The filtered set of objects may then include cars 316A and 316B mapped to right adjacent lane 342A, car 314 mapped to left adjacent lane 342C, pedestrian 320, and traffic light 322. For example, cars 312A-312R, and cars 318A-318C may be filtered out or discarded based on being mapped to lanes other than the current lane, the right adjacent lane to the current lane, and the left adjacent lane to the current lane (e.g., lanes on the opposite side on the divider, lanes for cross traffic). In this way, the object filter 110 may remove non-essential or non-priority objects present in non-essential lanes to generate a filtered set of objects.

Referring to FIG. 3C, FIG. 3C illustrates an example remaining list of objects generated by the object filter (e.g., the object filter 110) based on object class, in accordance with some embodiments of the present disclosure. Objects in the filtered set of objects (e.g., car 316A, car 316B, car 314, pedestrian 320, traffic light 322) may be further filtered to remove objects corresponding to non-essential object classes. The output of the object detector 104C (e.g., object locations, classification) may be used to determine objects in the filtered set of objects that correspond to non-essential object classes. As such, pedestrian 320 and traffic light 322 may be removed to generate the remaining list of objects (e.g., car 316A, car 316B, car 314) as evidenced by the remaining bounding boxes as essential objects corresponding to essential object classes. In this way, the object filter 110 may further remove objects corresponding to non-essential object classes prior to sending the remaining list of objects to the object tracker 112 for tracking in order to ultimately process and/or conduct safe driving operations in real-time or near real-time.

Figure 4:
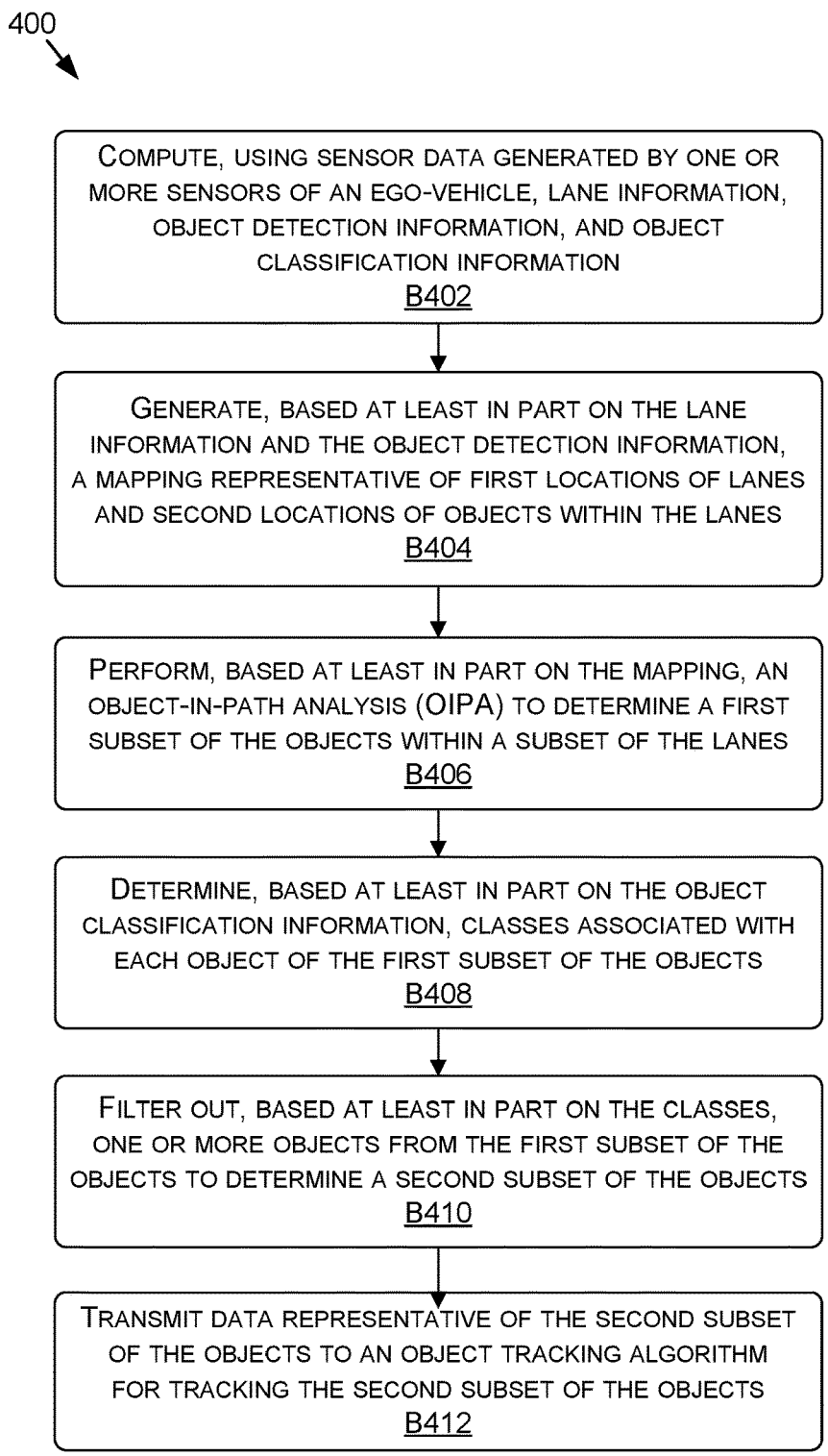
FIG. 4 is a flow diagram showing a method for detecting objects, and then filtering out detected objects to reduce the compute burden while also decreasing run-time for time-bound operations, in accordance with some embodiments of the present disclosure.

Now referring to FIGS. 4-5, each block of methods 400 and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 400 and 500 are described, by way of example, with respect to the processes 100 and 120 of FIGS. 1A and 1B, respectively. However, these methods may additionally or alternatively be executed in any one process by any one system, or any combination of processes and systems, including, but not limited to, those described herein.

FIG. 4 is a flow diagram showing a method 400 for detecting objects, and then filtering out detected objects to reduce the compute costs while also decreasing run-time for time-bound operations, in accordance with some embodiments of the present disclosure. The method 400, at block B402, includes computing, using sensor data generated by one or more sensors of an ego-vehicle, lane information, object detection information, and object classification information. For example, the detectors 104 may compute, using the sensor data 102, lane information using the lane detector 104A, and object detection information and object class information using the object detector 104C.

The method 400, at block B404, includes generating, based at least in part on the lane information and the object detection information, a mapping representative of first locations of lanes and second locations of objects within the lanes. For example, the object lane assignor 108 may generate a mapping representative of first locations of lanes and second locations of objects within the lanes.

The method 400, at block B406, includes performing, based at least in part on the mapping, an object-in-path analysis (OIPA) to determine a first subset of the objects within a subset of the lanes. For example, the object filter 110 may determine a first subset of objects (e.g., filtered set of objects) by performing an OIPA analysis based on the mapping.

The method 400, at block B408, includes determining, based at least in part on the object classification information, classes associated with each object of the first subset of the objects. For example, the object filter 110 may determine classes associated with each object of the first subset of objects based on the object classification information output by the object detector 104C.

The method 400, at block B410, includes filtering out, based at least in part on the classes, one or more objects from the first subset of the objects to determine a second subset of the objects. For example, the object filter 110 may filter out one or more objects (e.g., objects corresponding to non-essential object classes) from the first subset of objects to determine a second subset of objects (e.g., remaining list of objects) based on the classes.

The method 400, at block B412, includes transmitting data representative of the second subset of the objects to an object tracking algorithm for tracking the second subset of the objects. For example, data representative of the second subset of objects may be transmitted to the object tracker 112 for tracking the second subset of objects.

FIG. 5 is a flow diagram showing a method 500 for detecting objects, and then filtering out detected objects to reduce compute costs while also decreasing run-time for time-bound operations, in accordance with some embodiments of the present disclosure. The method 500, at block B502, includes computing, using sensor data generated by the one or more sensors of the ego-vehicle, lane information and object detection information. For example, the detectors 104 may compute, using the sensor data 102, lane information using the lane detector 104A, and object detection information using the object detector 104C.

The method 500, at block B504, includes localizing objects to lanes to generate a mapping based at least in part on the lane information and the object detection information. For example, the object lane assignor 108 may generate a mapping that localizes objects to lanes based on the outputs of the lane detector 104A, and the object detector 104C.

The method 500, at block B506, includes determining a subset of the objects within a subset of the lanes based at least in part on the mapping and a lane location criteria. For example, the object filter 110 may determine locations of a filtered set of objects and/or remaining list of objects within the current lane of the vehicle, the right adjacent lane to the current lane, and the left adjacent lane to the current lane based on the mapping and object class information.

The method 500, at block B508, includes transmitting data representative of the subset of the objects to an object tracking algorithm for tracking the second subset of the objects. For example, data representative of the filtered set of objects and/or remaining list of objects may be transmitted to the object tracker 112 for tracking the filtered set of objects and/or remaining list of objects.

Example Autonomous Vehicle

Figure 6A:
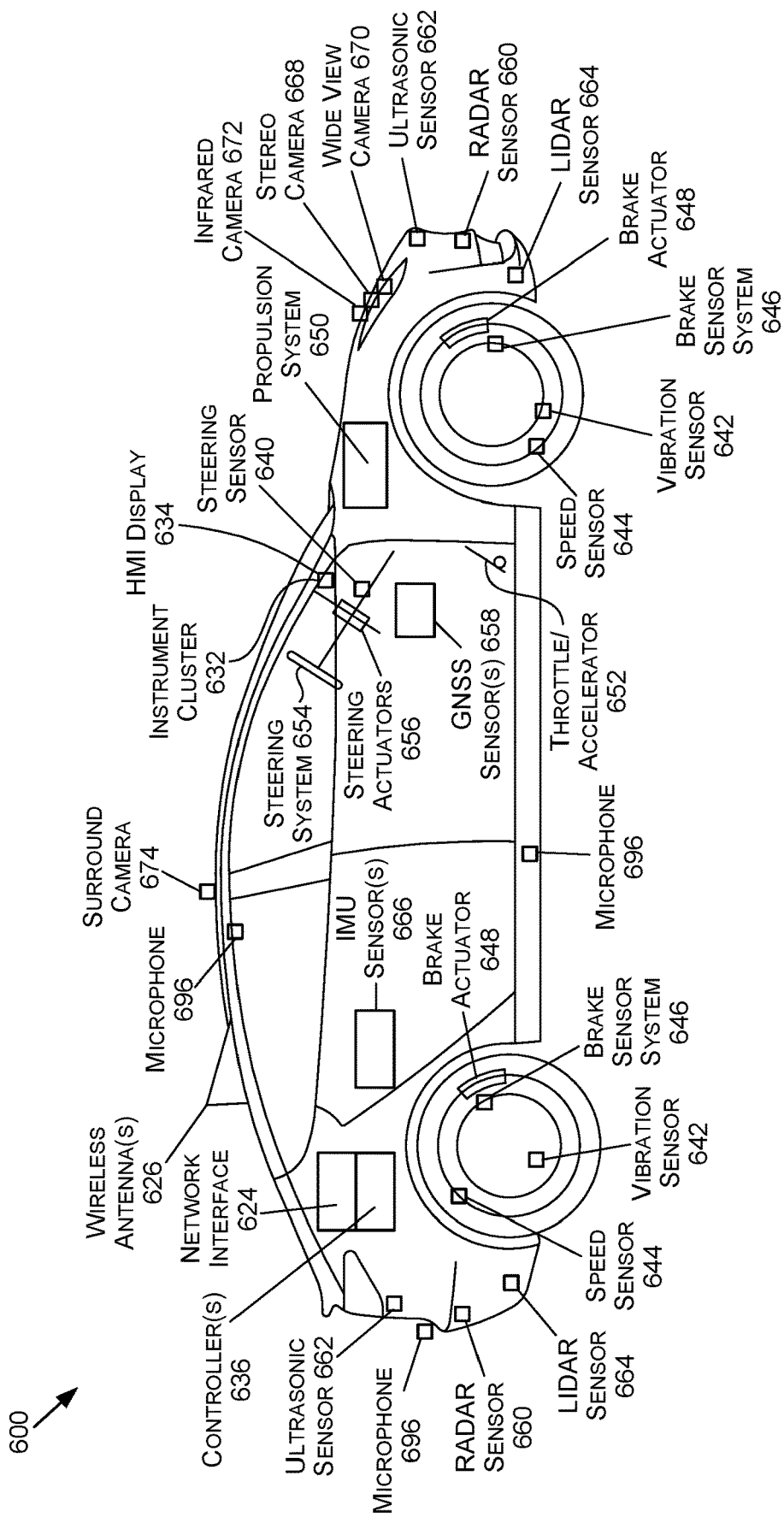
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3—Level 5 of the autonomous driving levels. For example, the vehicle 600 may be capable of conditional automation (Level 3), high automation (Level 4), and/or full automation (Level 5), depending on the embodiment.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
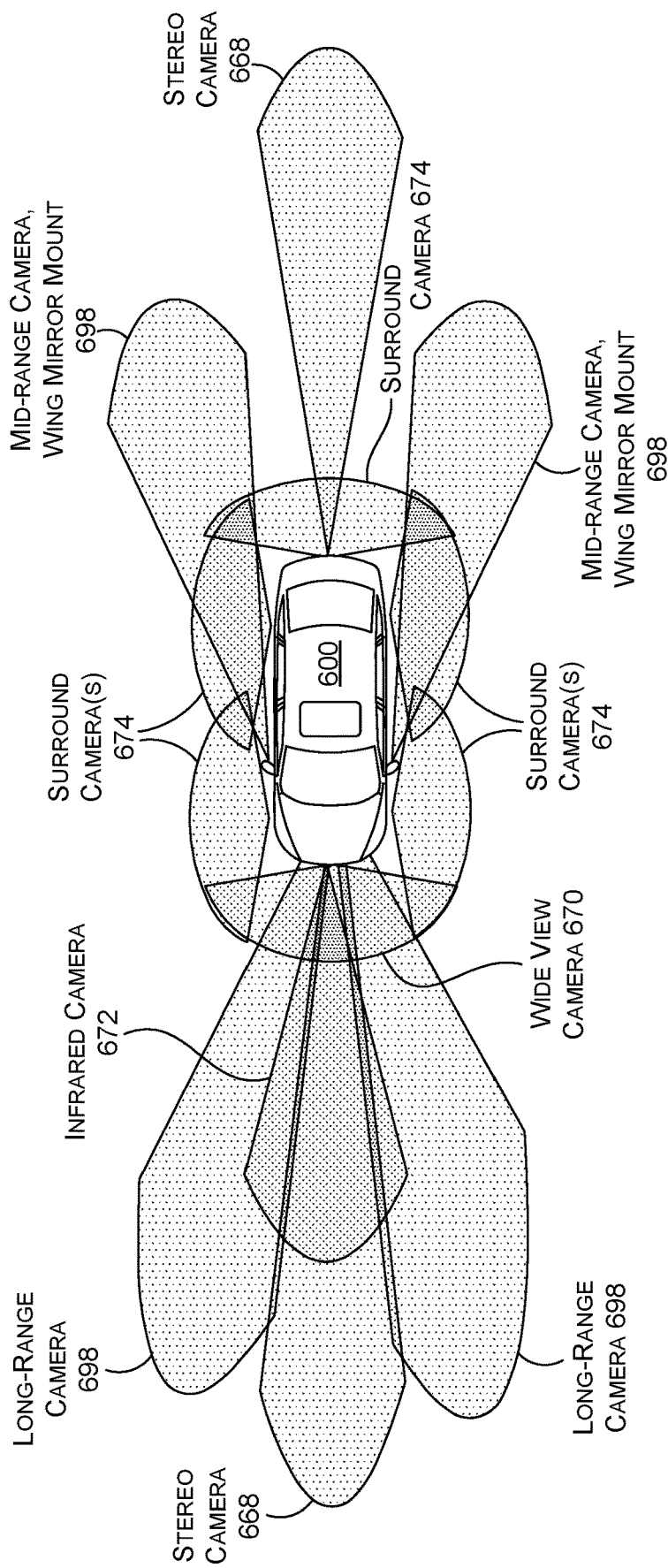
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting.

For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
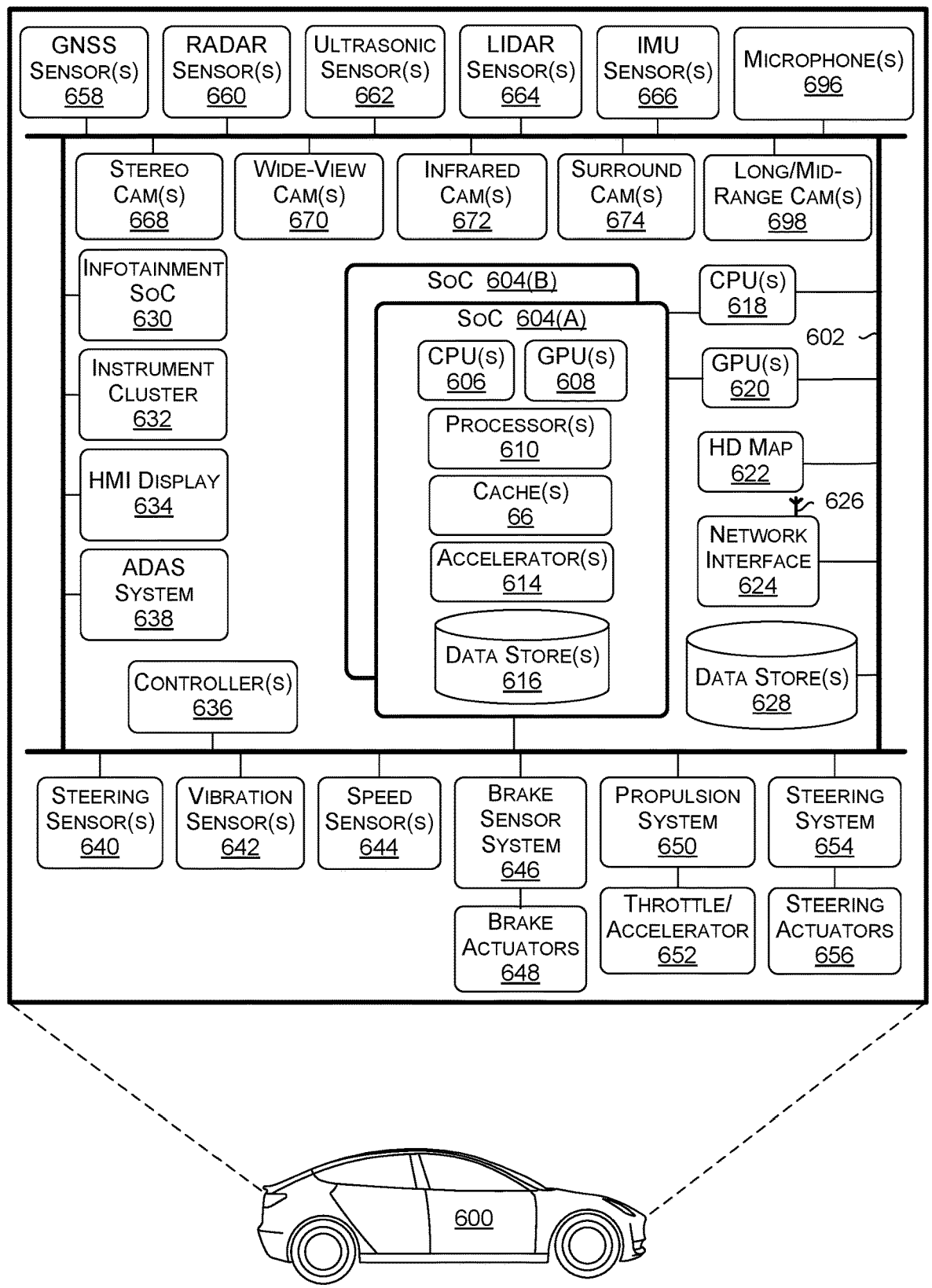
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK).

The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
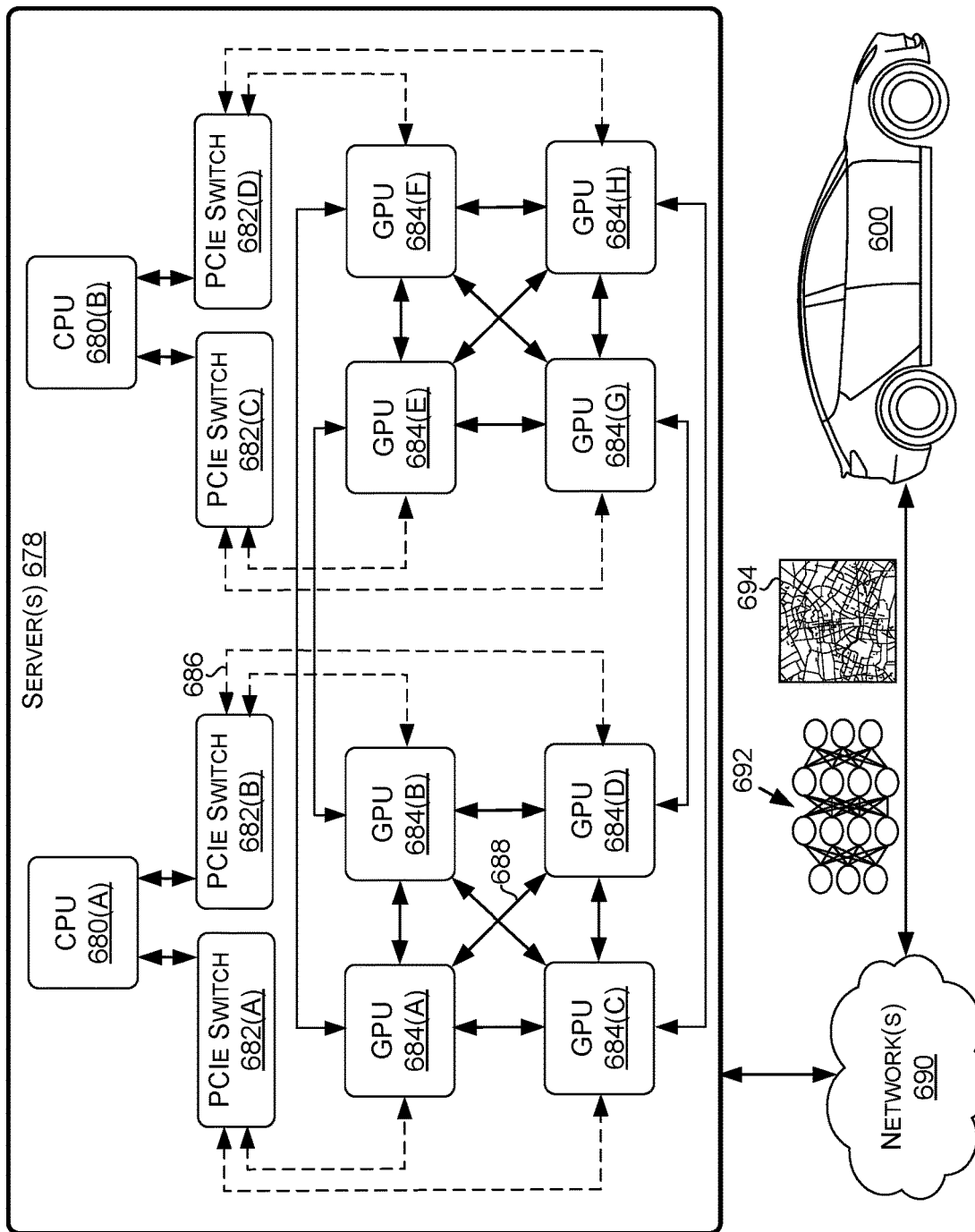
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
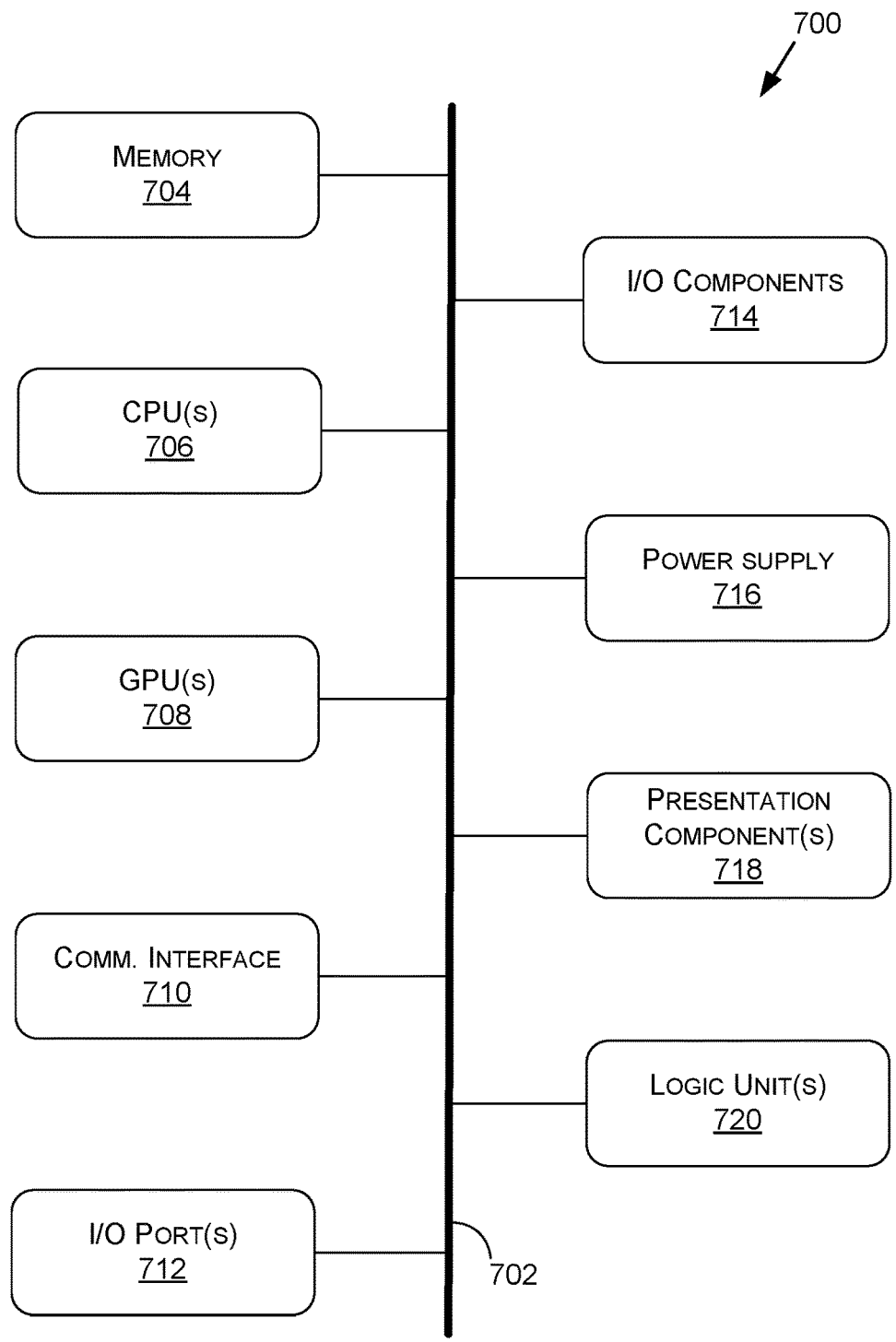
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Data Center

Figure 8:
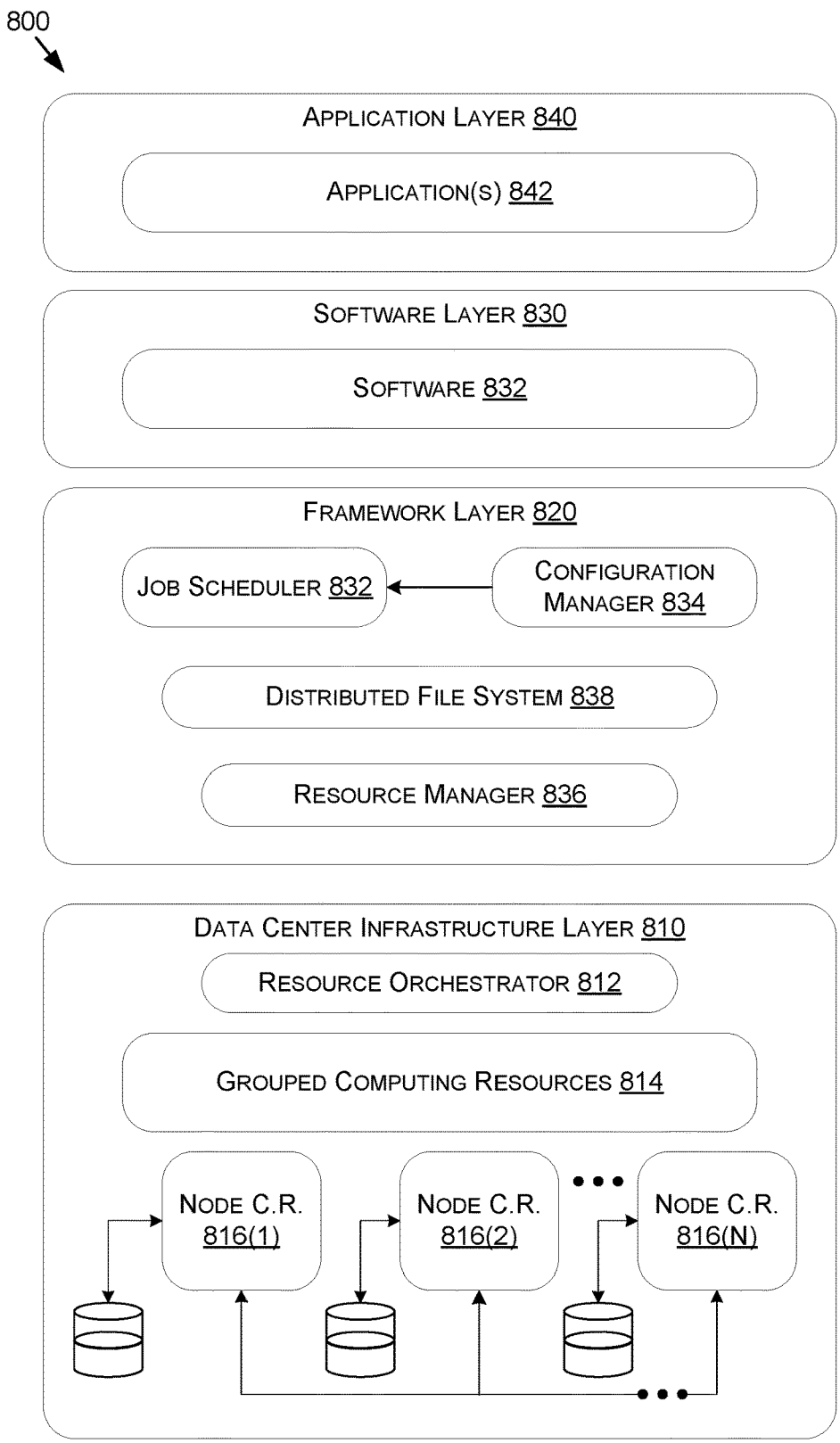
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, and/or other processors may be grouped within one or more racks to provide compute resources to support one or more workloads. The one or more racks may also include any number of power modules, cooling modules, and/or network switches, in any combination.

The resource orchestrator 822 may configure or otherwise control one or more node C.R.s 816(1)-816(N) and/or grouped computing resources 814. In at least one embodiment, resource orchestrator 822 may include a software design infrastructure ("SDI") management entity for the data center 800. The resource orchestrator 822 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 1036 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, using one or more graphics processing units (GPUs) and based at least on sensor data obtained using one or more sensors of a machine, a first set of objects that are located in an environment;
   determining, using the one or more GPUs, one or more classes associated with the first set of objects;
   determining, using one or more central processing units (CPUs) and based at least on the one or more classes, a second set of objects by filtering one or more objects from the first set of objects;
   determining, using the one or more CPUs and based at least on one or more lane graphs and one or more locations associated with the second set of objects, at least a portion of the second set of objects; and
   performing, using the one or more GPUs, object tracking with respect to the at least the portion of the second set of objects.

2. The method of claim 1, wherein:
   the one or more classes include at least a vehicle class associated with an object of the first set of objects; and
   the determining the second set of objects comprises determining, using the one or more CPUs and based at least on the vehicle class, to include the object in the second set of objects.

3. The method of claim 1, wherein:
   the one or more classes include at least a non-vehicle class associated with an object of the first set of objects; and
   the determining the second set of objects comprises determining, using the one or more CPUs and based at least on the non-vehicle class, to filter out the object from the second set of objects.

4. The method of claim 1, wherein the determining the second set of objects comprises:
   determining, using the one or more CPUs and based at least on the one or more classes, that a first object from the first set of objects is associated with a first class;
   determining, using the one or more CPUs and based at least on the one or more classes, that a second object from the first set of objects is associated with a second class; and
   determining, using the one or more CPUs, the second set of objects based at least on including the first object while filtering out the second object.

5. The method of claim 1, further comprising determining the one or more lane graphs, the one or more lane graphs including at least:
   a first lane graph associated with a first lane in which the machine is navigating; and
   at least one second lane graph associated with at least one second lane that is adjacent to the first lane.

6. The method of claim 1, further comprising:
   determining a path associated with the machine within the environment,
   wherein the determining the first set of objects is further based at least on the path associated with the machine.

7. The method of claim 1, wherein the determining the first set of objects that are located in the environment comprises:
   determining, using the one or more GPUs and based at least on the sensor data, objects that are located within the environment;
   determining at least one first object of the objects that is static or at least one second object of the objects that is located outside of the one or more lanes of the environment; and
   determining the first set of objects based at least on filtering out at least one of the at least one first object or the at least one second object.

8. The method of claim 1, wherein:
   the one or more GPUs are included as part of a first system-on-a-chip (SoC); and
   the one or more CPUs are included as part of a second SoC.

9. A system comprising:
   one or more graphics processing units (GPUs) to:
      determine, based at least on sensor data obtained using one or more sensors of an ego-machine, a first set of objects that are located within an environment; and
      perform one or more tracking operations with respect to at least a second set of objects associated with the first set of objects; and
   one or more central processing units (CPUs) to:
      determine, based at least on one or more classes associated with the first set of objects, a third set of objects from the first set of objects; and
      determine, based at least on one or more first locations associated with one or more regions of the environment and one or more second locations associated with the third set of objects, the second set of objects from the third set of objects.

10. The system of claim 9, wherein the determination of the third set of objects comprises:
    determining that the one or more classes includes a vehicle class associated with an object from the first set of objects; and
    determining, based at least on the vehicle class, to include the object in the third set of objects.

11. The system of claim 9, wherein the determination of the third set of objects comprises:
    determining that the one or more classes includes a non-vehicle class associated with an object from the first set of objects; and
    determining, based at least on the non-vehicle class, to not include the object in the third set of objects.

12. The system of claim 9, wherein the one or more GPUs are further to determine the one or more first locations as including a first lane graph associated with a first region for which the ego-machine is navigating;

at least one second lane graph associated with at least one second region that is adjacent to the first region.

13. The system of claim 9, wherein the one or more CPUs are further to:

determine a path associated with the ego-machine within the environment, wherein the determination of the second set of objects is further based at least on the path associated with the ego-machine.

14. The system of claim 9, wherein the first set of objects includes one or more dynamic objects located within the environment.

15. The system of claim 9, wherein the system is comprised in at least one of a control system for an autonomous or semi-autonomous machine;

a perception system for an autonomous or semi-autonomous machine;

a system for performing simulation operations;

a system for performing digital twin operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

16. The system of claim 9, wherein:

the one or more GPUs are included as part of a first system-on-a-chip (SoC); and the one or more CPUs are included as part of a second SoC.

17. An autonomous or semi-autonomous machine comprising:

one or more external sensors having one or more fields of view or one or more sensory fields external to the autonomous or semi-autonomous machine, one or more central processing units (CPUs) to:

determine a subset of objects based at least on filtering out one or more objects from a set of objects based at least on one or more object classes associated with the one or more objects; and determine, based at least on one or more first locations associated with one or more lanes and one or more second locations associated with the subset of objects, at least a portion of the subset of objects; and one or more graphics processing units (GPUs) to:

determine, based at least on at least a first portion of sensor data obtained using the one or more external sensors, the one or more object classes associated with the one or more objects;

determine, based at least on at least a second portion of the sensor data, the one or more first locations associated with the one or more lanes; and track the at least the portion of the subset of objects.

18. The autonomous or semi-autonomous machine of claim 17, wherein the subset of objects is further determined based at least on a path associated with the autonomous or semi-autonomous machine within the environment.

19. The autonomous or semi-autonomous machine of claim 17, wherein:

the one or more GPUs are further to send, to the one or more CPUs, data associated with the set of objects; and the one or more CPUs are further to send, to the one or more GPUs, data indicating the at least the portion of the subset of objects.

20. The autonomous or semi-autonomous machine of claim 17, wherein:

the one or more GPUs are included as part of a first system-on-a-chip (SoC); and the one or more CPUs are included as part of a second SoC.

\* \* \* \* \*